Nov. 21, 1939.  H. J. CHAPMAN  2,180,398
AERIAL
Filed April 26, 1938  2 Sheets-Sheet 1
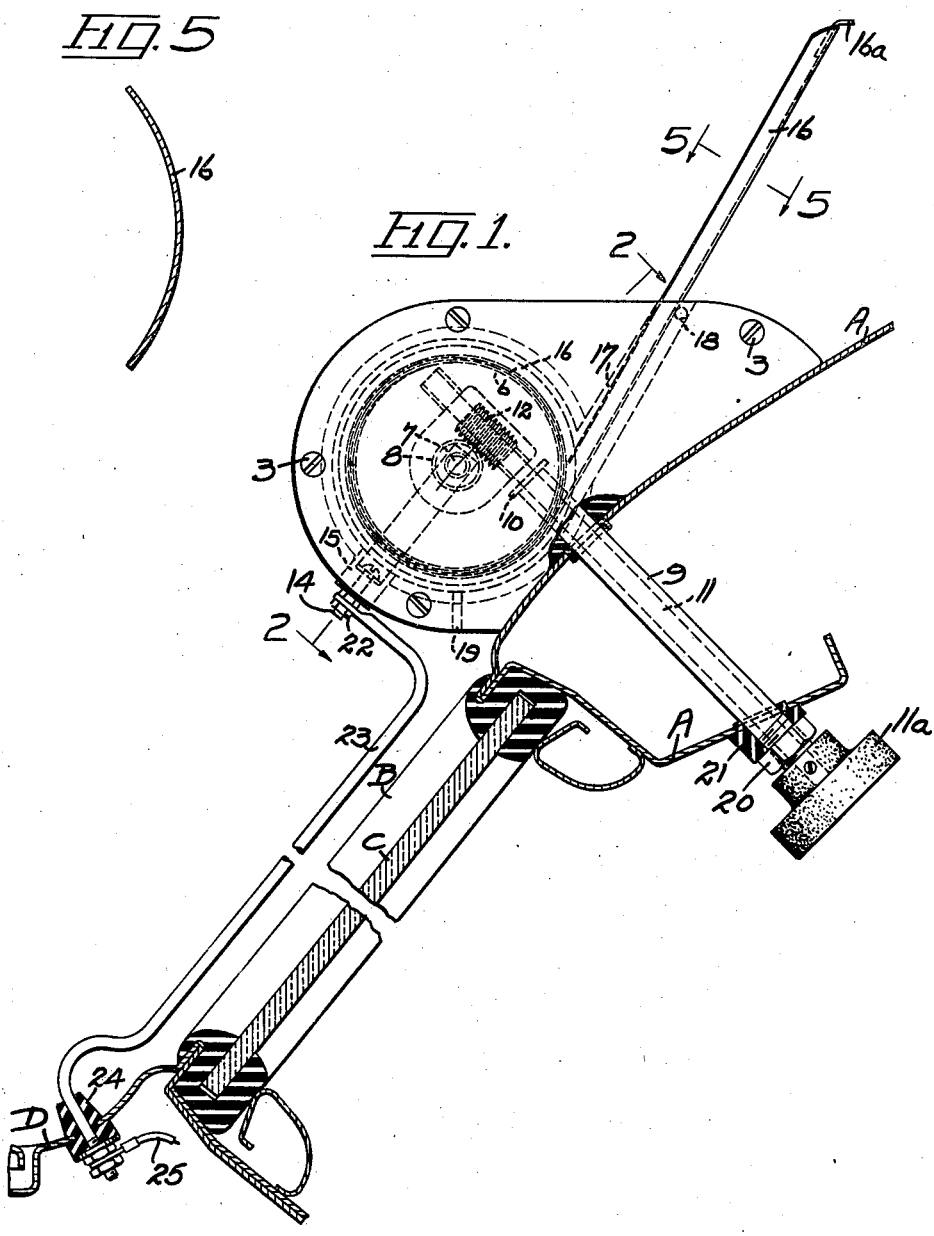
INVENTOR.
Harry J. Chapman
BY
Gerald Baldwin
ATTORNEY.

Nov. 21, 1939. H. J. CHAPMAN 2,180,398
AERIAL
Filed April 26, 1938 2 Sheets-Sheet 2
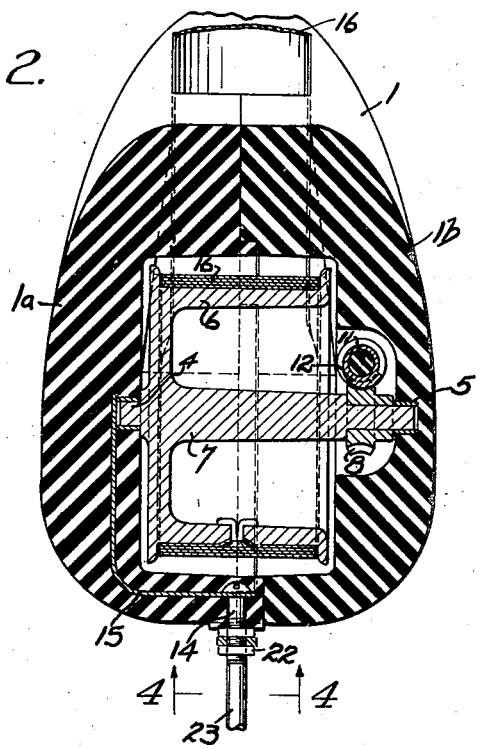
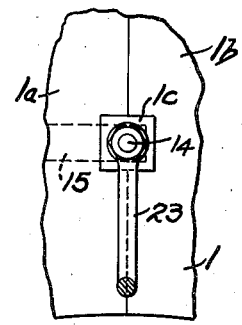
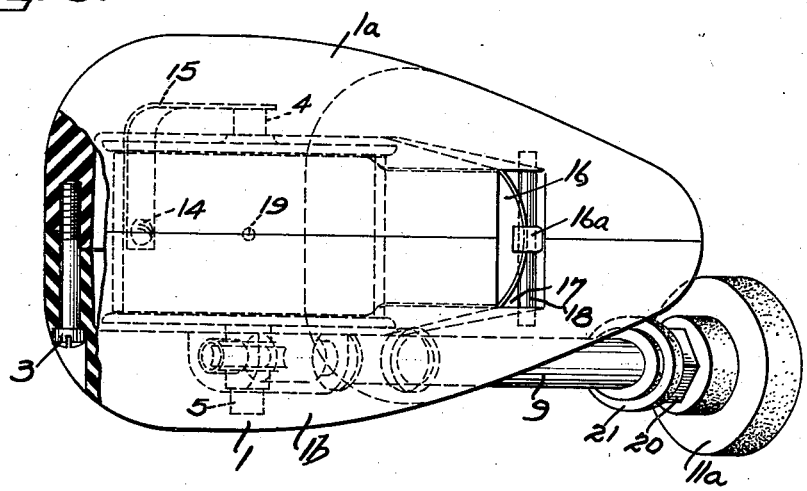
INVENTOR.
Harry J. Chapman
BY
Gerald J. Baldwin
ATTORNEY.

Patented Nov. 21, 1939

2,180,398

UNITED STATES PATENT OFFICE 2,180,398

AERIAL

Harry J. Chapman, Detroit, Mich.

Application April 26, 1938, Serial No. 204,386

5 Claims. (Cl. 250—33)

This invention relates to improvements in aerials, and refers more particularly to aerials for use on automobiles.

It is an object of the invention to provide an aerial consisting in part of a flexible aerial member carried in a housing adapted to be mounted upon the outside of the roof of a car, and provided with means operable within the car for causing the said aerial member to project varying distances from the housing. Thus I aim to provide an aerial with which local stations may be picked up when the aerial member is disposed almost entirely within the housing, and wherein the aerial may, while travelling, be adjusted to extend varying distances from the housing so that more distant stations may be received. Furthermore this invention aims to provide an aerial with which reception may be had with the aerial member protected by the housing against the elements, and without limiting its scope or range due to insufficient capacity which would be the case if it could not be extended at will from the housing.

Another object of the invention is to provide such an aerial wherein the member is arranged, when outwardly extended, to project upwardly and rearwardly from the housing sufficiently to prevent the metal roof and body of the car interfering with its reception and weakening its signals.

A further object of the invention is to provide such an aerial which is so constructed that its operating is not interrupted by rain entering the housing through the slot through which the aerial member extends.

Having thus briefly stated some of the major objects and advantages of the invention I will now proceed to describe a preferred embodiment thereof with the aid of the accompanying drawings in which:

Figure 1 illustrates a side view of the invention mounted upon a car, the portions of the latter which are shown being in section.

Figure 2 is a section on the line 2—2 of Figure 1.

Figure 3 is a plan view of the aerial, one portion being shown in section.

Figure 4 is a partial view on the line 4—4 of Figure 1, and

Figure 5 is an enlarged section on the line 5—5 of Figure 1.

Referring to the drawings, 1 designates a housing made of suitable non-conducting material, and consisting of two portions 1a and 1b which are held together as by screws 3. Mounted one in each of the housing portions 1a and 1b are aligned bearings 4 and 5 which support opposite ends of a shaft 7 having a spool 6 thereon. Fixed upon the shaft 7, which in this case is integral with the spool 6, and between the latter and the bearing 5, is a wormwheel 8. Extending through the housing portion 1b is a sleeve 9 which in the present instance terminates at its inner extremity in a collar 10 embedded in the said portion 1b by which it is held immovable. The bearings 4 and 5, the spool 6 and its shaft 7, the wormwheel 8 and the sleeve 9 are, in the present instance all made of non-ferrous metal. Extending through the sleeve 9 is a rod 11 which may be made of insulating material and has a worm 12 secured upon one extremity to mesh with the wormwheel 8. To facilitate rotation of the rod 11 an operating knob 11a is fixed upon the other extremity which projects beyond the outer end of the sleeve 9.

From Figure 4 it will be noted that a lateral projection 1c upon the housing portion 1a extends into a corresponding recess formed in the housing portion 1a. Mounted to extend outwardly from the projection 1c is a terminal 14 to which one extremity of a contact 15 is secured. The latter is preferably embedded in the housing portion 1a and extends to the bearing 4 to which it is also connected.

A flexible tape or aerial member 16 has one extremity fastened to the periphery of the spool 6 around which it is adapted to be wound. The spool is preferably in the form of a double-flanged pulley, and the aerial member projects therefrom through a narrow slot 17 formed partly through each of the two housing portions 1a and 1b. The outer extremity of the aerial members 16 is flexed at 16a to prevent its entrance into the housing slot 17. This member is generally made of flexible rustproof steel and I prefer to roll it so that when outstretched it assumes the concavo-convex form shown in Figure 5, as by so doing I find that the member is materially strengthened, and that it will as easily roll flat upon the spool 6. 18 denotes a guide element which extends into and across the slot 17, and has its extremities supported in the housing portions 1a and 1b. This element, which is preferably circular in section, provides a narrow guide for the aerial member and holds the latter spaced from the bottom of the slot to reduce frictional contact with the latter. Formed through the housing portions 1a and 1b is a drain opening 19 through which rain or other moisture entering through the slot 17 may escape.

The housing 1 rests upon the roof A of a car adjacent the front extremity of the latter and preferably centrally of its width. The sleeve 9 extends through the said roof and is threaded at its outer extremity to receive a nut 20 which is tightened against a resilient washer 21 which, in turn, bears against the underside of the roof A to hold the housing in position. Secured as by a nut 22 upon the terminal bolt 14 is one extremity of a rod 23 which passes downward in front of the central vertical partition B which usually divides the modern windshield C. The lower extremity of the rod 23 passes through an insulating element 24 mounted in the car cowl D, and suitably secured to the lower extremity of the said rod beneath the hood is one end of a conventional lead-in wire 25 the opposite extremity of which is connected to a radio receiver—not shown.

From the foregoing it will be clearly seen that a signal received by the aerial member 16, whether almost completely wound around the spool 6, as shown in Figure 3, or outstretched as shown in Figure 1, passes through the spool 6, spindle 7, bearing 4, contact 15, terminal 14, and rod 23 to the lead-in wire 25. The worm 12, which may be made either of conducting or insulating material, is spaced from the upper extremity of the sleeve 9 which is embedded in the housing portion 1b, and consequently there is no fear of a contact being made between the roof A and the portions of the aerial through which the signal received by the aerial member 16 travels.

While in the foregoing the preferred embodiment of the invention has been described and shown, it is understood that the construction may be varied, particularly as to the utilization of conducting or insulating materials for the various parts, provided the said variations fall within the scope of the appended claims.

What I claim is:

1. An aerial comprising a housing adapted to be mounted upon the top of a car roof, a spool mounted for rotation in the housing, a sleeve extending from the housing and adapted to pass through the car roof, means for holding said sleeve and housing immovable relative to the roof, a resilient aerial member having an inherent tendency to straighten wound around said spool and having its outer extremity projecting through a slot formed through the housing, means extending through the sleeve for rotating the spool and varying the distance which the outer extremity of said member projects, a terminal carried by the housing, an electrical contact extending from the terminal to the aerial member, and insulation so positioned with reference to the assembly as to form an insulated electric conductor between said aerial and said terminal.

2. An aerial comprising a slotted housing, a spindle mounted therein, a spool mounted thereon, a gear mounted thereon to rotate the spool, a sleeve extending from the housing, a rod extending through the sleeve, a gear carried by the rod in mesh with the first named gear whereby rotation of the rod turns the spool, a resilient aerial member having an inherent tendency to straighten wound upon the spool and having one extremity secured thereto, said member extending through the slot in the housing, a terminal carried by the housing, and insulated electric conducting means connecting said terminal with the aerial member.

3. An aerial comprising a housing adapted to rest upon the roof of a car, a sleeve extending downward from the housing and adapted to pass through the roof, means on the outer extremity of the sleeve for holding the sleeve and housing immovable relative to the roof, bearings provided in said housing, a spool mounted for rotation between the bearings, a resilient aerial member having an inherent tendency to straighten wound upon the spool and having its inner extremity secured thereto, the outer extremity of the member projecting through an upwardly and rearwardly disposed slot formed through the housing, means extending through the sleeve for rotating the spool and winding and unwinding the member therearound, whereby its outer extremity may be arranged to project varying distances from the housing, a terminal carried by the housing, means connecting the terminal electrically with the aerial member, and insulation so positioned with reference to the assembly as to form an insulated electric conductor between said aerial and said terminal.

4. A vehicle radio aerial comprising, in combination with a vehicle body, a housing, means securing the housing to the exterior of the body, an aperture in the housing, a resilient antenna wound upon a rotatable spindle and having an inherent tendency to straighten positioned in said housing with one end passing through said aperture, means to rotate the spindle for moving said antenna back and forth through said aperture, means connected with said last-mentioned means and passing through the vehicle body for actuating said last-mentioned means, a terminal positioned by said housing, and an insulated connection between the inner end of said antenna and said terminal.

5. A vehicle radio aerial comprising, in combination with a vehicle body, a housing, a tubular member secured to said housing and extending through the vehicle body securing the housing thereto, an aperture in the housing, a resilient antennna wound upon a rotatable spindle and having an inherent tendency to straighten positioned in said housing with one end passing through the aperture, means to rotate the spindle for moving said antenna back and forth through said aperture, means connected with said last-mentioned means and extending through said tubular member for actuating said last-mentioned means, a terminal positioned by said housing, and an insulated connection between the inner end of said antenna and said terminal.

HARRY J. CHAPMAN.